Dec. 15, 1970 — A. L. VAN GEET — 3,548,297
TEMPERATURE SENSOR FOR A NUCLEAR MAGNETIC RESONANCE SPECTROMETER SYSTEM
Filed Sept. 23, 1968 — 3 Sheets-Sheet 1

INVENTOR.
Anthony L. Van Geet
BY
ATTORNEY.

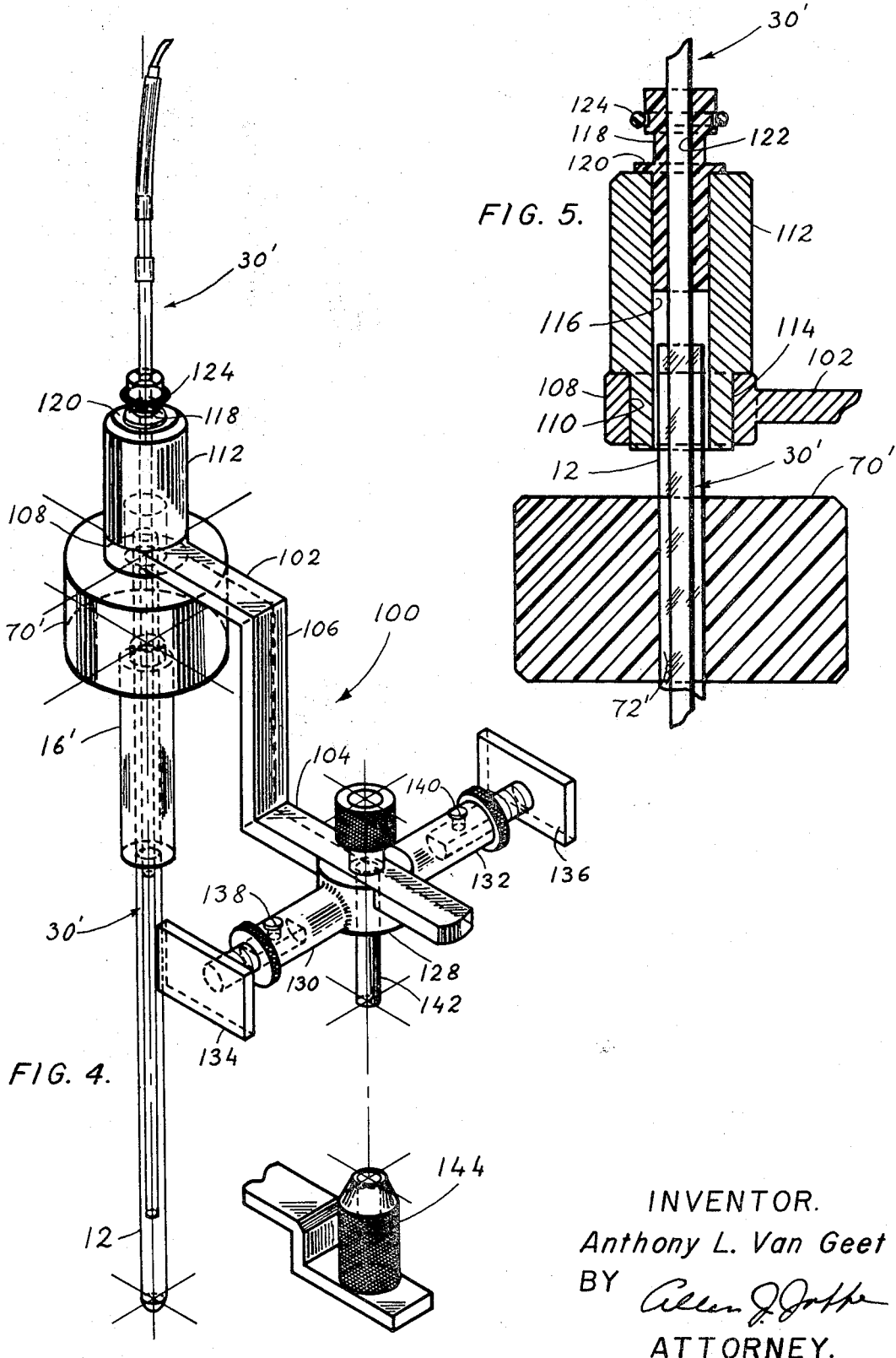

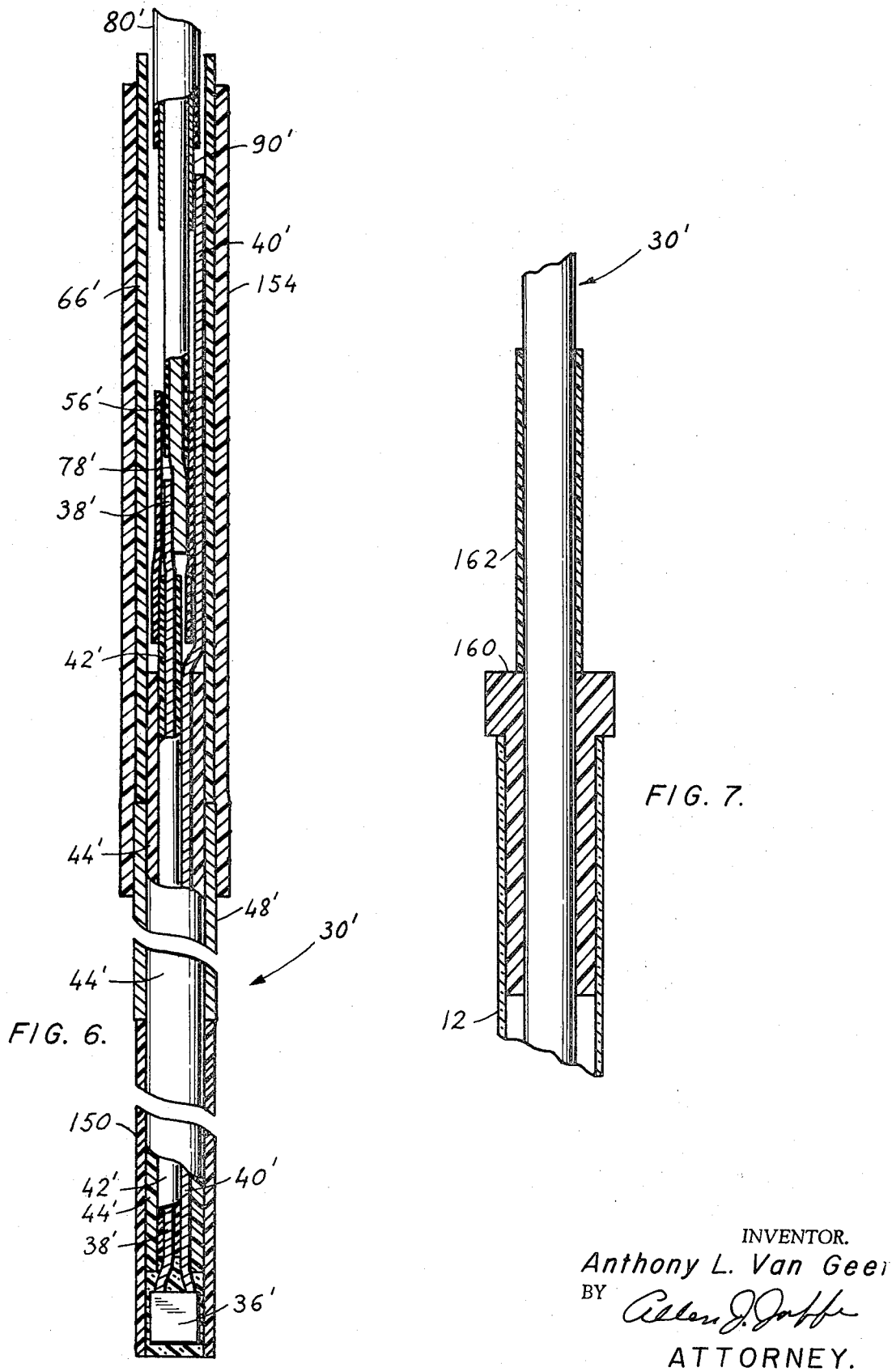

… …

United States Patent Office 3,548,297
Patented Dec. 15, 1970

3,548,297
TEMPERATURE SENSOR FOR A NUCLEAR MAGNETIC RESONANCE SPECTROMETER SYSTEM
Anthony L. Van Geet, 77 Coronation Drive,
Amherst, N.Y. 14226
Filed Sept. 23, 1968, Ser. No. 761,753
Int. Cl. G01n 27/78
U.S. Cl. 324—0.5       8 Claims

ABSTRACT OF THE DISCLOSURE

A temperature sensor located within the spinning sample tube of a nuclear magnetic resonance spectrometer and a balancing cylindrical weight mounted about the sample tube for preventing vertical movement of the tube and/or sensor due to the coolant fluid flow.

The sensor may be stationary or it may spin with the tube. In the former case, a clamp or bearing is provided to center and support the sensor.

BACKGROUND OF THE INVENTION

The present invention relates to a temperature sensing apparatus utilized to determine the temperature of a sample in a nuclear magnetic resonance (NMR) spectrometer system.

As is well known, an analytical NMR spectrometer, such as the Varian Model A-60, provides a highly accurate and nondestructive means of determining chemical bonding configurations and proton counts in liquids and soluble organic compounds. Operation of the NMR spectrometer is based on the fact that all atomic nuclei having spin or angular momentum possess a magnetic moment due to the presence of charge. Such nuclei display a characteristic defined as the magnetogyric ratio, the ratio of magnetic moment to angular momentum. This ratio is immutable and distinct for each species. The NMR spectrometer is used to determine functions of this ratio whereby many unknown compounds may be identified.

In nuclear magnetic resonance, the temperature of a sample is commonly obtained by measuring the chemical shift of methanol or of 1,2 - ethanediol (glycol). Many errors in the results of studies on proton exchange have been attributed to the temperature measurement.

In high resolution NMR spectrometers, sample spinning is usually accomplished with a turbine driven by compressed air, such as the Varian 911-302 and a complication may arise during operation at variable temperature. The nitrogen coolant flow to control sample temperature which occurs along the outside of the sample tube tends to lift the turbine rotor out of its spinner housing resulting in a stoppage of spinning and premature termination of the experiment. Pressure caps that have been used to balance the nitrogen pressure require considerable skill. Also, the spinning rate is high and difficult to control.

SUMMARY OF THE INVENTION

The foregoing, and other, disadvantages of the prior art are overcome according to the present invention which provides apparatus for measuring the temperature of the sample directly within the spinning sample tube.

In one form, the temperature sensing apparatus rotates with the sample and a coupling is provided to deliver the output signal to a point of use such as a controller or recorder.

In another form, the sensing apparatus is stationary with respect to the spinning sample and is accurately located within the sample tube by means of a clamp assembly or bearing.

Additionally, a novel means is provided to prevent the turbine rotor of the NMR spectrometer from being lifted out of its housing by means of the coolant flow. This comprises a cylindrical weight that fits about the sample tube in contact with the turbine rotor.

It is accordingly an object of the present invention to provide a temperature sensing apparatus combined with the probe assembly of a NMR spectrometer that has a negligible effect on the temperature of the sample and which does not interfere with the nuclear magnetic resonance experiment and which is small enough to fit within the sample tube.

It is a further object of the present invention to provide a weight that rotates with the sample tube of the NMR spectrometer probe that positively prevents the coolant from lifting the tube.

BRIEF DESCRIPTION OF THE DRAWINGS

For a fuller understanding of the present invention, reference should now be had to the following detailed description of the same taken in conjunction with the accompanying drawings wherein:

FIG. 4 is a perspective view of the tube of a NMR spectrometer incorporating a modified form of temperature sensor;

FIG. 5 is an enlarged fragmentary sectional view of a portion of the apparatus shown in FIG. 4;

FIG. 6 is an enlarged fragmentary sectional view of the temperature sensor employed in the FIG. 4 embodiment; and FIG. 7 is a fragmentary sectional view illustrating an alternate support for the temperature sensor shown in FIG. 4.

DESCRIPTION OF THE PREFERRED EMBODIMENTS

Figure 1:
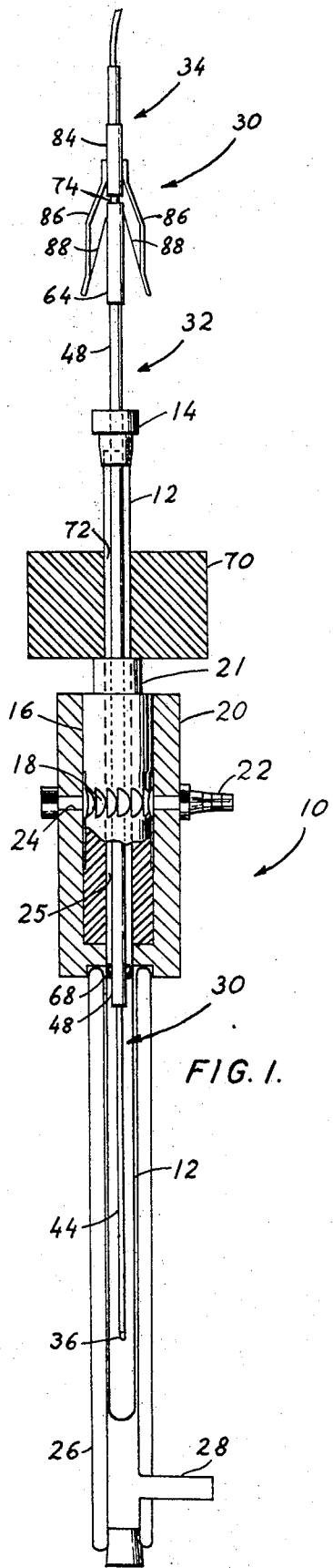
FIG. 1 is an elevational view partially in section of the temperature sensor of the present invention in operative relation to the probe of the nuclear magnetic resonance spectrometer.
Figure 2:
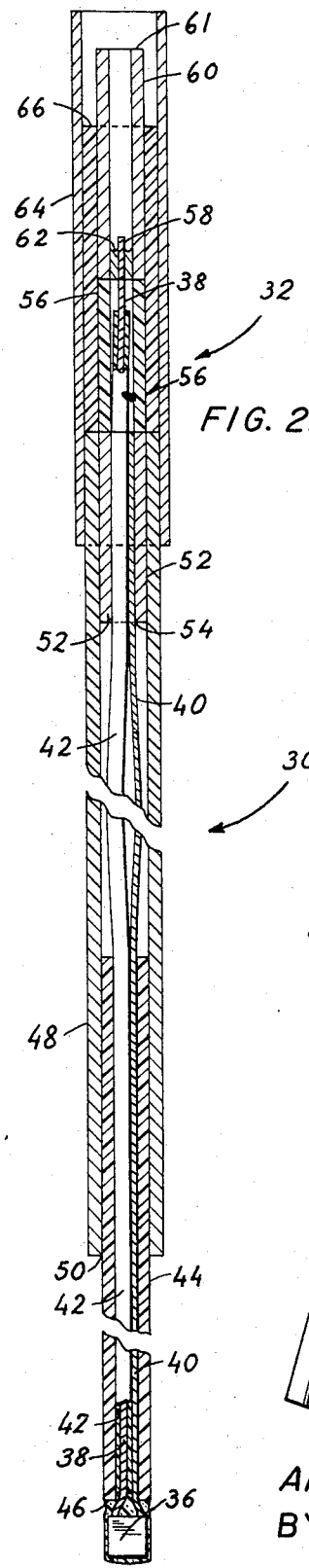
FIG. 2 is enlarged fragmentary sectional view of a part of the temperature sensor shown in FIG. 1.
Figure 3:
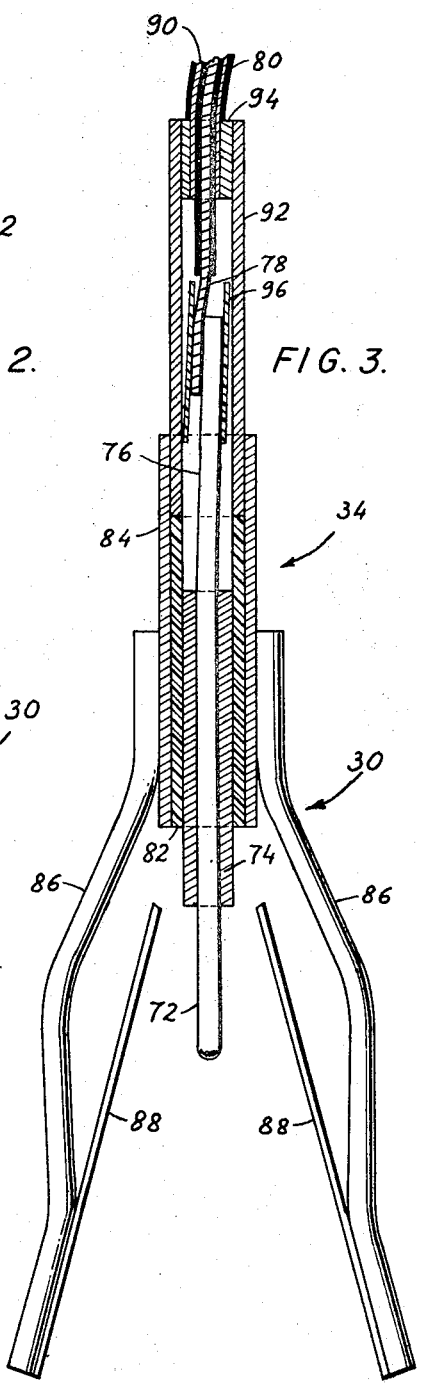
FIG. 3 is an enlarged sectional view of the remainder of the sensor of FIG. 1 that is coupled to the part thereof shown in FIG. 2.

Referring now to the drawing and, more particularly, to the embodiment shown in FIGS. 1, 2 and 3 the probe for the NMR spectrometer is generally indicated by the numeral 10, and, as is conventional, comprises a container or tube 12 adapted to hold the sample undergoing the spectral analysis. Tube 12 is fabricated of glass or other similar material and is closed at an upper end thereof by a ported cap 14. The tube 12 is adapted to be rotated by an air turbine 16 that is friction fitted to the outer periphery of the tube. Turbine 16 contains a plurality of circumferentially arrayed vanes 18 and fits within a cylindrical turbine housing 20 and terminates in a reduced diameter collar 21. A compressed air supply nozzle 22 is located in housing 20 adjacent the vanes 18 for the rotation thereof as is well known. A suitable air outlet 24 is provided. The glass tube 12 is friction fitted into a central opening 25 of the turbine for rotation therewith.

The probe thus far described is typical and together with a probe housing of a NMR spectrometer into which the probe is adapted to fit is currently commercially available, as, for example, variable temperature probe for use in the Varian Model A-60 analytical NMR spectrometer system and other similar models.

The probe insert is shown schematically at 26 in FIG. 1 and contains a support port 28 for a suitable coolant fluid such as nitrogen, which flows upwardly around the sample tube 12 to maintain the temperature constant of the sample therewithin.

For control and/or indication of the temperature of the sample within the rotating tube 12, the temperature sensing apparatus according to the present invention is provided and is generally depicted at 30. The temperature sensor comprises two coupled sections; a rotating section 32 and a stationary section 34. The stationary section comprises a tip thermistor or the like sensor 36 suitably joined to two connecting copper wires 38 and 40. Wire 38 is covered by an insulating tube 42 of polyperfluoroehylene or the like material. A larger diameter insulating tube 44 surrounds tube 42 and wire 40 and may be extruded "spaghetti" tubing of electrical grade. One end 46 of tube 44 is cemented to the thermister 36 by a suitable commercially available cement of high chemical resistance. Some of the epoxy cements have been found to be satisfactory. A cylindrical metal tube 48 fits over insulating tube 44 and is cemented thereto at 50. Tube 48 is in electrical contact with copper wire 40 via an inner metallic tube 52 which surrounds tube 42 and wire 40 and is soldered thereto as at 54. As shown, the exposed copper wire 40 terminates at the upper end (as viewed in FIG. 2) of tube 52. The insulated copper wire 38 extends upwardly beyond an insulating tube 56 that is equal in diameter to and in abutting relation with metal tube 52 and is cemented at an exposed terminal 58 thereof to a metallic inner coupling tube 60 via solder 62.. A metallic outer coupling tube 64 is in electrical contact with and cemented to tube 48 and extends beyond inner coupling tube 60 in spaced coaxial relation thereto. An insulating sleeve 66 is interposed between tubes 60 and 64. It thus can be seen that tube 60 carries the electrical signal from copper wire 38 whereas tube 64 carried the electrical signal from wire 40.

Tube 48 is friction fitted through the port in cap 14 allowing the lower portion of the rotating assembly 32 to extend into sample container 12 with the thermister 36 located adjacent the bottom thereof. Tube 48 is centered by a polyperfluorethylene ring 68 which fits snugly therearound, but slides freely within container 12.

For a purpose to become apparent hereinbelow, a cylindrical weight 70 having a central opening 72 which fits snugly about tube 12 is provided above and in contact with collar 21. The weight is preferably fabricated of polyperfluorethylene or other suitable polymer.

The stationary section 34 of the temperature sensor is shown greatly enlarged in FIG. 3 and comprises a central metal shaft 72 that is adapted to fit rotatably within the opening in inner coupling member 60 on top of rotating unit 32 making electrical contact therewith and with wire 38. A metal sleeve 74 surrounds and supports shaft 72 which is adapted to abut the and 61 of tube 60 when sections 32 and 34 are assembled. Electrical contact is therefore made with tube 60 with shaft 72 and sleeve 74; greatly reducing the noise that would be caused by intermittent contact. Shaft 72 has an inclined end 76 that is soldered to the inner conductor 78 of a coaxial cable 80.

A snug fitting insulating tube 82 surrounds tube 74 and thereby holds shaft 72 firmly in place. An outer metal tube 84 surrounds tube 82 and has suitably affixed thereto a pair of stiff metal ears 86 that extend outwardly and downwardly from tube 84. Ears 86 supports two flexible conducting wires 88 that are adapted to fit over and make rubbing contact with outer coupling tube 64 as shown in FIG. 1. To reduce friction, these wires are very thin and preferably made of a soft metal such as copper.

Electrical contact is made from outer coupling tube 64, and therefore from wire 40, through spring wires 88, ears 86, tube 84, the outer shield 90 of coaxiable cable 80 via a metal sleeve 92 and a conducting ring 94. A small insulating tube or tape 96 is provided about the joinder between shaft end 76 and conductor 78 to prevent possible shorting due to contact with metal tube 92. Cable 80 may lead to any suitable indicator and/or controller.

As should be readily apparent, the turbine 16 causes the tube 12 to rotate and through the connection therewith at 14 the sensor is also caused to rotate and it therefore can sense the temperature of the sample fluid in the actual test environment without interference with the experiment.

The coolant flow through port 28 flows upwardly about tube 12 and acts against the lower end of the turbine between the turbine and its housing tending to lift the turbine upwardly. The weight 70 is so chosen to resist this upward movement and thereby counter the force exerted by the fluid. It is found that member 70 should weigh at least 28 grams to operate satisfactorily with the standard NMR spectrometer mentioned above.

Instead of utilizing the spinning temperature sensor of FIGS. 1–3, the stationary or static sensor of FIGS. 4, 5, and 6 might be employed. In this embodiment like numerals primed refer to like of the FIGS. 1–3 embodiment.

Referring to FIGS. 4 and 5, the temperature sensor 30' is adapted to be placed within the sample container 12 and held in spaced relation from the walls thereof such that sensor 30' remains stationary while container 12 rotates. To this end, a clamp generally depicted at 100 is utilized.

The clamp comprises a bracket having a pair of parallel arms 102 and 104 joined by a perpendicular central section 106. Arm 102 has at its end and integral therewith an annular collar 108 having a central opening 110 therethrough. An aluminum collar (tubular) 112 has a reduced diameter 114 that is adapted to fit snugly within the opening 110. Collar 112 has a central bore 116 that is adapted to receive at its upper end a tubular nylon centering insert 118, that is flanged at 120 and abutted against the upper end of member 112. Insert 118 has a central throughbore 122 to receive and snugly support the stationary temperature sensor 30'. As shown in FIG. 5, the arrangement is such to maintain the sensor assembly 30' spaced from the walls of the sample container 12. A resilient compression ring 124 fits into an annular groove at the upper end of insert 118, as illustrated to force insert into intimate contact with sensor 30'.

Arm 104 is adapted to fit with a slot 126 of a cylindrical hub 128, that has projecting from opposite sides thereof a pair of expansion plate support members 130 and 132. Flat expansion plates 134 and 136 adjust to fit within end openings of the support members 130 and 132. Set screws 138 and 140 are provided to lock the plates in position. The plates 134 and 136 are adapted to fit between the faces of the magnetic coil (not illustrated) of the above mentioned NMR spectrometer to prevent lateral movement of the temperature sensor 30'. The clamp and hence the sensor 30' is located in position by means of a centering pin 142 passing through openings in arm 104 and hub 128 and projecting into the conventional vertical position knurled nut 144 of the spectrometer (only a portion of which is illustrated).

As shown in FIG. 6, the static temperature sensor is generally similar to the rotating sensor previously described; thus, only the few differences will be described. The lower portion of sensor 30' is made thicker than the spinnig sensor 30 by the provision of an additional outer insulating plastic sleeve 150. The extra thickness is necessary for increased rigidily to maintain the sensor straight. This sleeve 150 is fitted over tube 44' against and cemented to metal tube 152. At the upper end of the sensor 30' an outer plastic tube 154 is provided for handling purposes.

In operation, the temperature sensor 30' with its heat responsive tip 36' in inserted into the sample container 12 of the probe of the NMR spectrometer and is centered and held rigidly in place between the conventional magnetic coils by means of insert 118 and expansion plates 134 and 136 and locating pin 142.

As the container or tube 12 and its contents rotate, the stationary sensor responds to the temperature of the sample fluid, and signals are developed in cable 80' that are indicative thereof. Cable 80' may be connected to a suitable controller and/or indicator.

In FIG. 7, an alternate form of support for the stationary temperature sensor is provided, which comprises a sleeve bearing 160 fitting precisely in the sample tube 12. Bearing 160 is made out of a low friction material such as polyperfluorethylene. The sensor 30' fits freely with the central bore of the bearing such that the latter can rotate freely with respect thereto. A support sleeve 162 is friction fitted to the sensor 30' and rests on top of the bearing 160, thus limiting the vertical movement of the sensor in the sample tube 12.

Although the sensor tip has been disclosed as a thermistor, other temperature responsive means might be utilized as for example, a thermocouple.

Other embodiments will occur to those skilled in the art, therefore, it is intended that the scope of the invention is to be limited only by the scope of the appended claims.

I claim:
1. A nuclear magnetic resonance spectrometer probe comprising:
    (a) a tubular sample container,
    (b) means for causing said container to spin,
    (c) an elongated temperature sensor fitting within the sample container without touching the walls or any other part thereof,
    (d) means connected to said sensor for delivering an electrical output in response to temperature changes thereof, said sensor comprising:
    (e) an upper stationary section,
    (f) a lower rotating section coupled to said upper stationary section,
    (g) said rotating section being mounted for rotation with said container, and comprises:
    (h) a heat responsive tip,
    (i) two wires extending upwardly from said tip,
    (j) an outer tubular coupling member in electrical communication with one of said wires,
    (k) an inner tubular coupling member in electrical communication with the other of said wires,
    (l) said upper stationary section comprises an inner projecting conducting shaft that is adapted to fit rotatably within said inner tubular coupling member, and
    (m) a pair of outer contacting members in the form of spring wires that are adapted to make sliding contact with the peripheral surface of said outer coupling member.
2. The apparatus according to claim 1, wherein:
    (n) said means for causing said container to spin comprises a compressed air driven turbine, and there is further provided a chamber surrounding said container for supplying a coolant fluid thereabout, and
    (o) a cylindrical weight supported by said turbine acting by gravity against the upward forces exerted by said coolant fluid flow.
3. The apparatus according to claim 2, wherein:
    (p) said weight has a central opening that surrounds an upper portion of the outer periphery of said tubular container.
4. A nuclear magnetic resonance spectrometer probe comprising:
    (a) a tubular sample container,
    (b) means for causing said container to spin,
    (c) an elongated temperature sensor fitting within the sample container without touching the walls or any other part thereof,
    (d) means connected to said sensor for delivering an electrical output in response to temperature changes thereof, said sensor being supported by stationary support means comprising:
    (e) a tubular insert surrounding and frictionally engaging the upper portion of said sensor,
    (f) a collar supporting said insert,
    (g) an annular member surrounding and supporting said collar,
    (h) a bracket having a first arm attached to said annular member,
    (i) a parallel second arm connected to said first arm,
    (j) a slotted hub receiving said second arm, and
    (k) a pair of adjustable expansion plates supported on opposite sides of said hub adapted to be locked between the magnetic coils of said nuclear magnetic spectrometer.
5. The apparatus according to claim 4, further comprising:
    (l) a locating pin projecting from the bottom surface of said hub and adapted to fit within an opening on said nuclear magnetic spectrometer.
6. The apparatus according to claim 5, wherein:
    (m) said means for causing said container to spin comprises a compressed air driven turbine, and there is further provided a chamber surrounding said container for supplying a coolant fluid thereabout, and
    (n) a cylindrical weight supported by said turbine acting by gravity against the upward forces exerted by said coolant fluid flow.
7. The apparatus according to claim 6, wherein:
    (o) said weight has a central opening that surrounds an upper portion of the outer periphery of said tubular containers.
8. A nuclear magnetic resonance spectrometer probe comprising:
    (a) a tubular sample container,
    (b) means for causing said container to spin,
    (c) an elongated temperature sensor fitting within the sample container without touching the walls or any other part thereof,
    (d) means connected to said sensor for delivering an electrical output in response to temperature changes thereof, said sensor being supported by a stationary support comprising:
    (e) a sleeve friction fitted to an upper portion of said sensor, and there being further provided,
    (f) an elongated tubular bearing fitted within said container for rotation therewith, and
    (g) said sleeve rests upon an end of said bearing for relative rotation therewith.

References Cited
UNITED STATES PATENTS

| 2,864,995 | 12/1958 | Shoolery | 324—0.5 |
| 3,122,703 | 2/1964 | Rempel | 324—0.5 |

OTHER REFERENCES

F. Conti, Simultaneous Temperature Measurements in High Resolution NMR Experiments, Rev. of Sci. Instr., 38(1), January 1967, p. 128.

MICHAEL J. LYNCH, Primary Examiner